(12) United States Patent
Harada

(10) Patent No.: US 8,943,097 B2
(45) Date of Patent: Jan. 27, 2015

(54) INFORMATION MANAGEMENT APPARATUS, INFORMATION MANAGEMENT SYSTEM, NON-TRANSITORY COMPUTER READABLE MEDIUM THAT STORES INFORMATION MANAGEMENT PROGRAM AND INFORMATION MANAGEMENT METHOD

(75) Inventor: Yushi Harada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 195 days.

(21) Appl. No.: 13/602,834

(22) Filed: Sep. 4, 2012

(65) Prior Publication Data

US 2013/0229693 A1    Sep. 5, 2013

(30) Foreign Application Priority Data

Mar. 5, 2012 (JP) ................................ 2012-048106

(51) Int. Cl.
*G06F 7/00* (2006.01)
*G06F 17/30* (2006.01)
(52) U.S. Cl.
USPC .......................................................... 707/781
(58) Field of Classification Search
CPC ................. G06F 17/30265; G06F 17/30244; G06F 17/30256
USPC .......................................................... 707/781
See application file for complete search history.

(56) References Cited

U.S. PATENT DOCUMENTS

| 8,442,922 | B2 * | 5/2013 | Martin | 705/319 |
| 2010/0290701 | A1 * | 11/2010 | Puneet et al. | 382/164 |
| 2011/0289567 | A1 * | 11/2011 | Bauer-Hermann et al. | 726/6 |
| 2012/0114192 | A1 * | 5/2012 | Bladel et al. | 382/115 |

FOREIGN PATENT DOCUMENTS

JP        A-2010-2964       1/2010

* cited by examiner

*Primary Examiner* — Mariela Reyes
*Assistant Examiner* — Jeffrey Chang
(74) *Attorney, Agent, or Firm* — Oliff PLC

(57) ABSTRACT

An information management apparatus includes: a memory storing main information to be stored to be identified by at least an identification code; a receiving unit receiving the identification code for identifying the main information and image information where character information for specifying a user of the main information is photographed; a specifying unit specifying the stored main information on the basis of the identification code and specifying the user on the basis of the character information, among the received image information; a character information photographing region determining unit determining which main character information photographing region the character information belongs to, among plural predetermined character information photographing regions; and an access right assigning unit assigning a predetermined type of access right to the user specified from the character information for each determined character information photographing region.

11 Claims, 13 Drawing Sheets

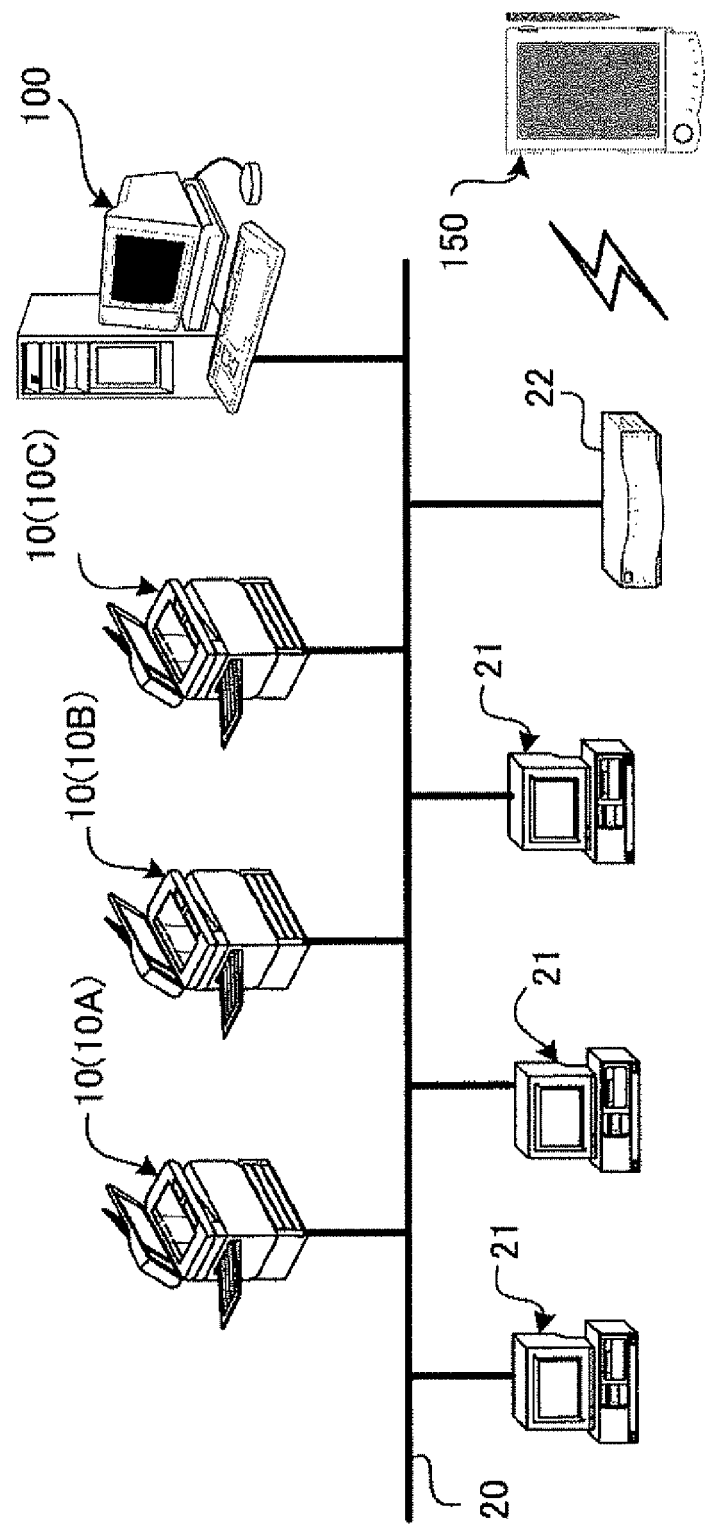

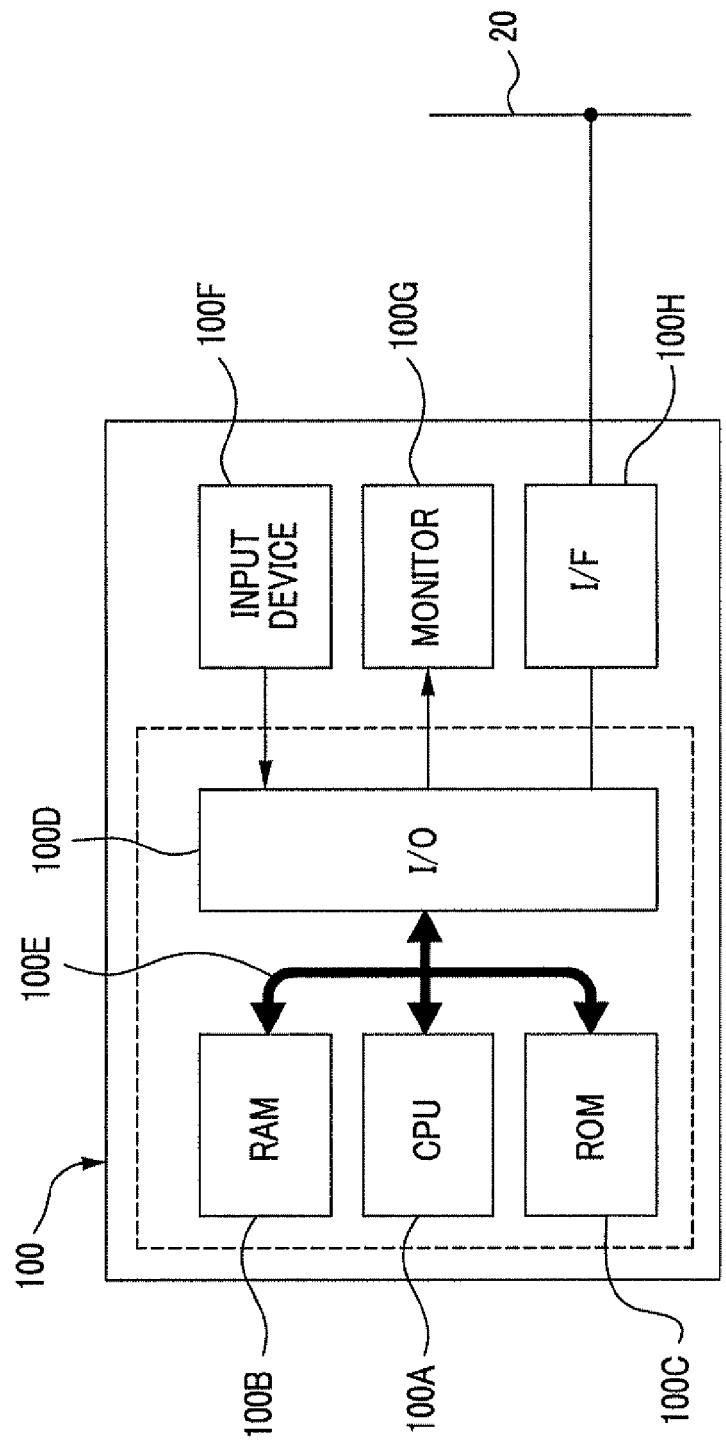

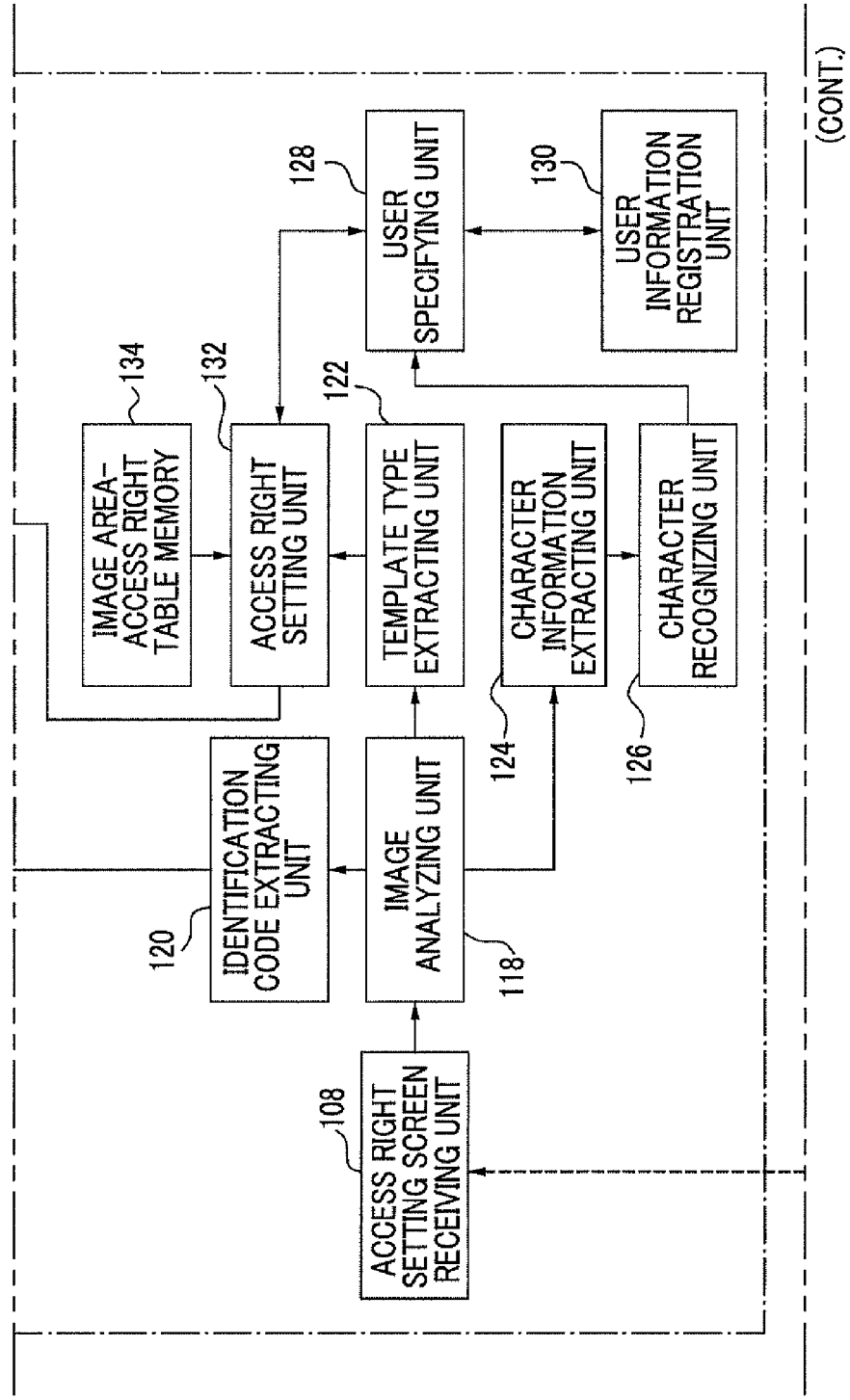

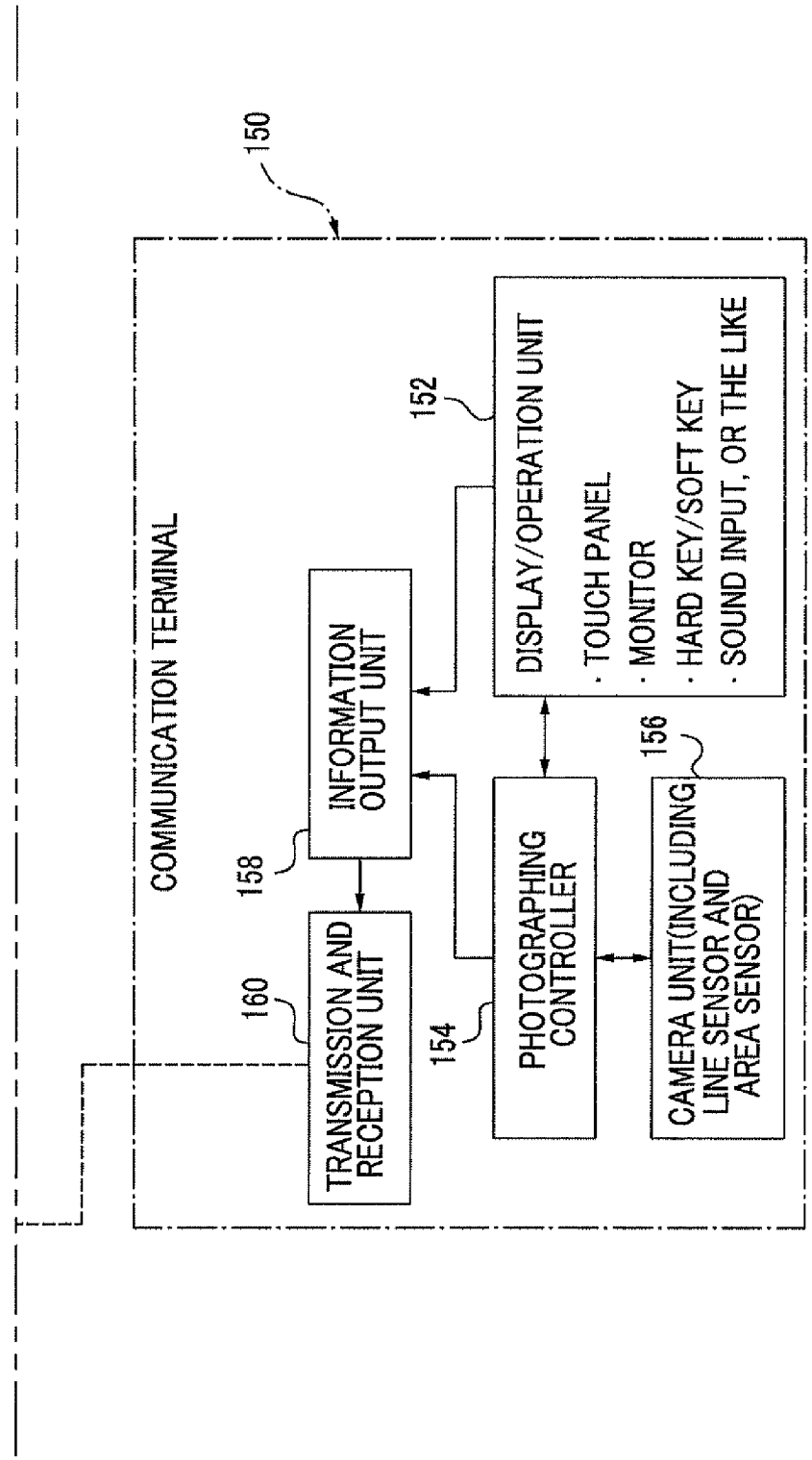

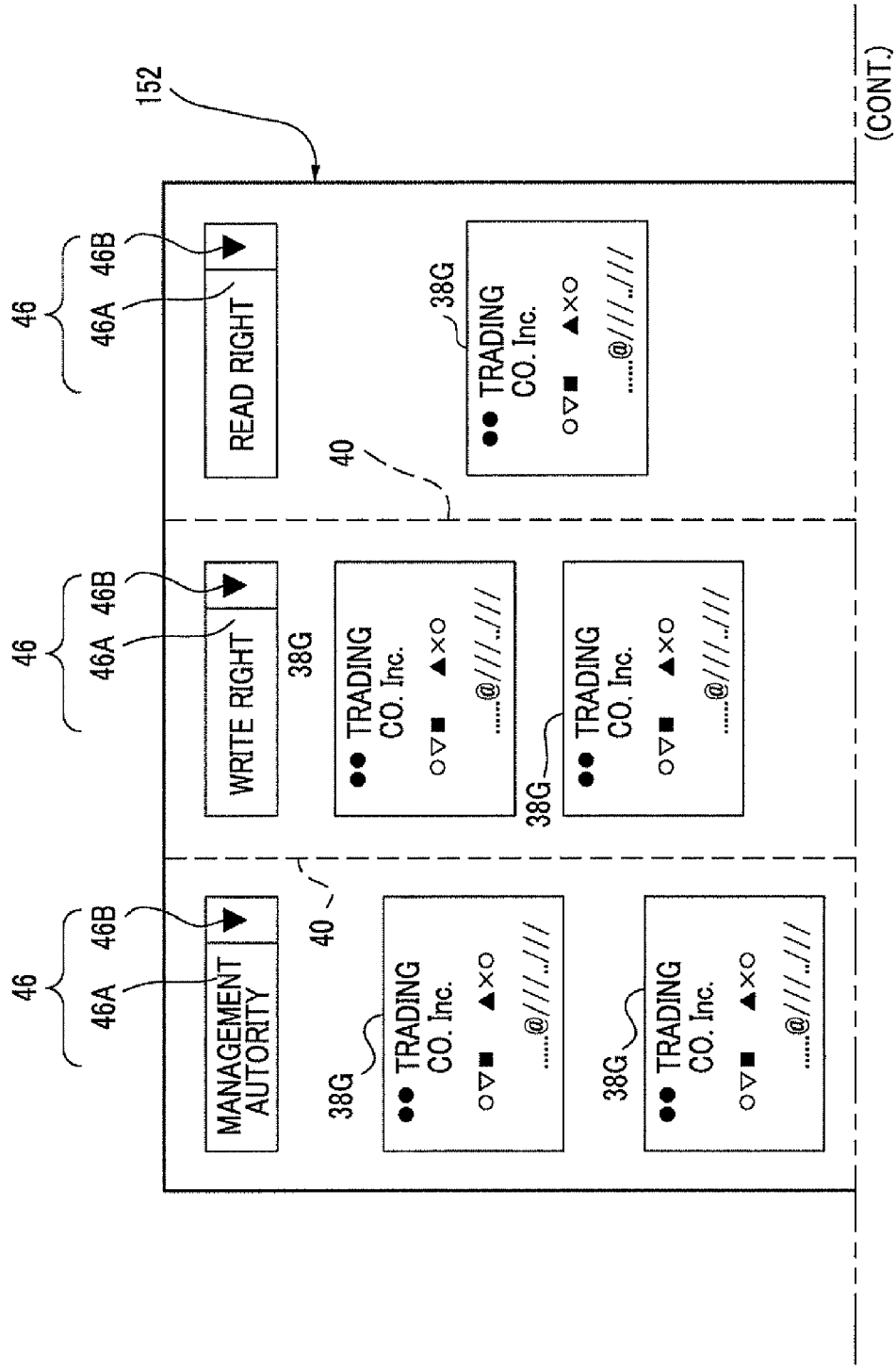

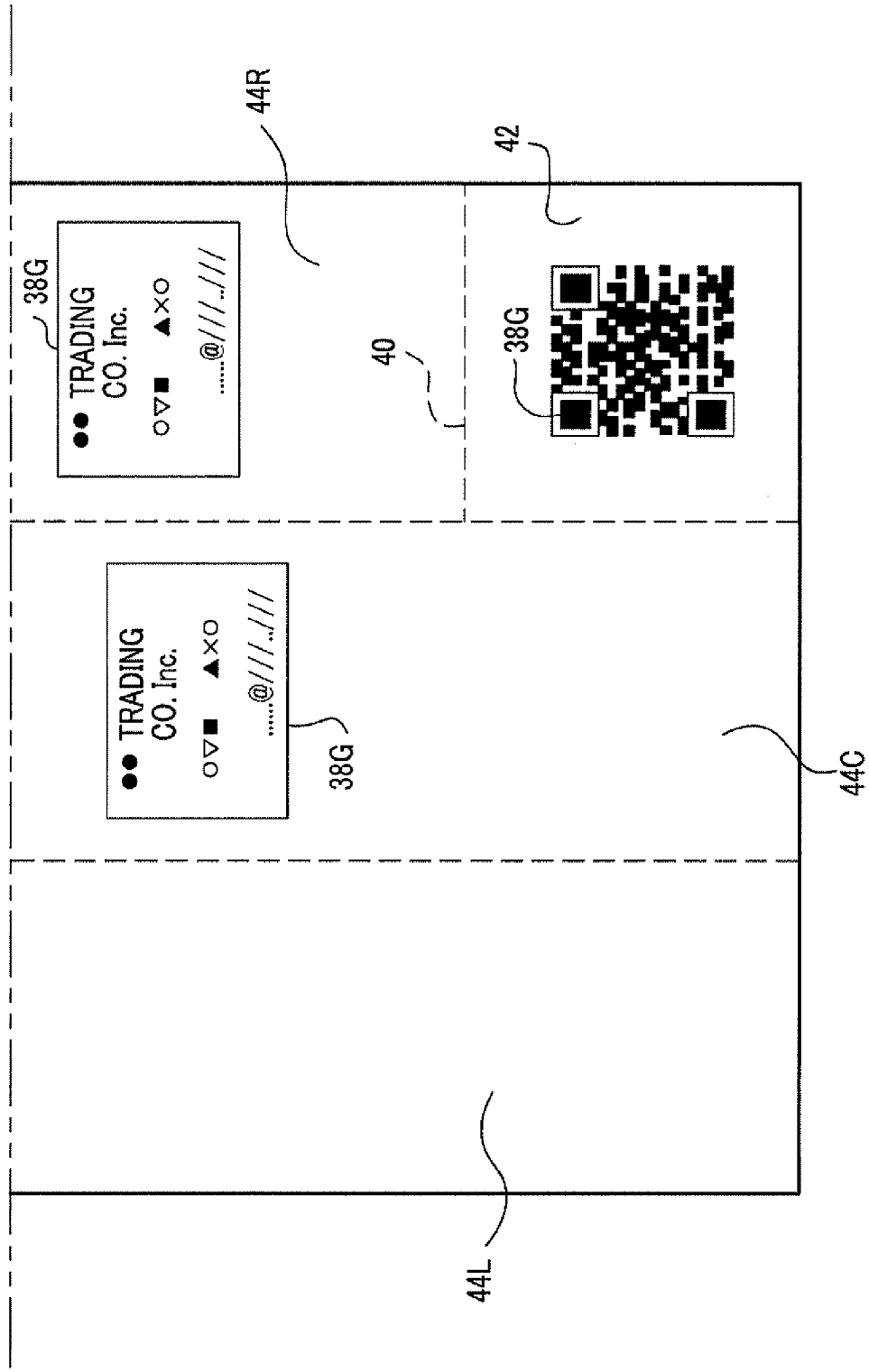

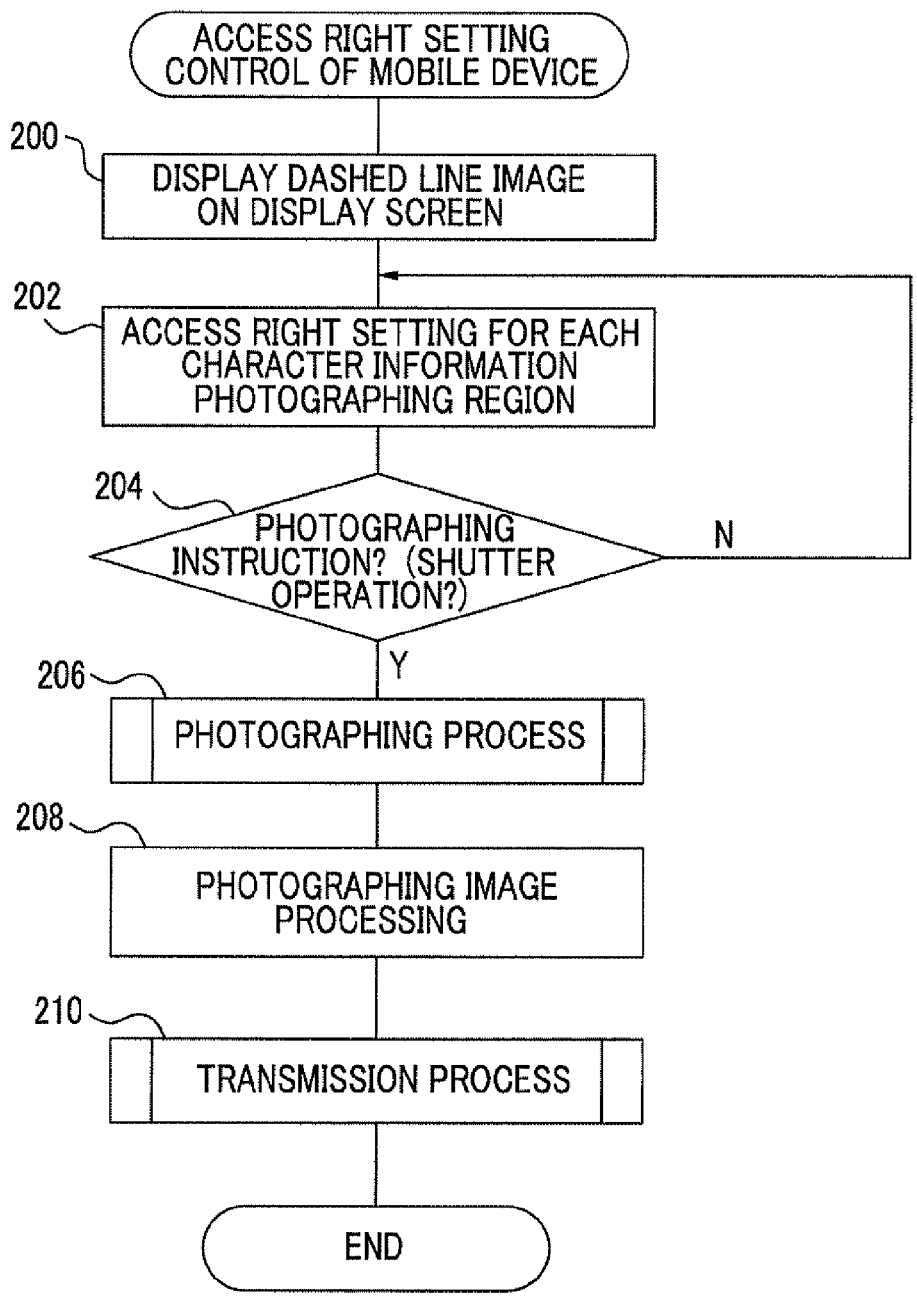

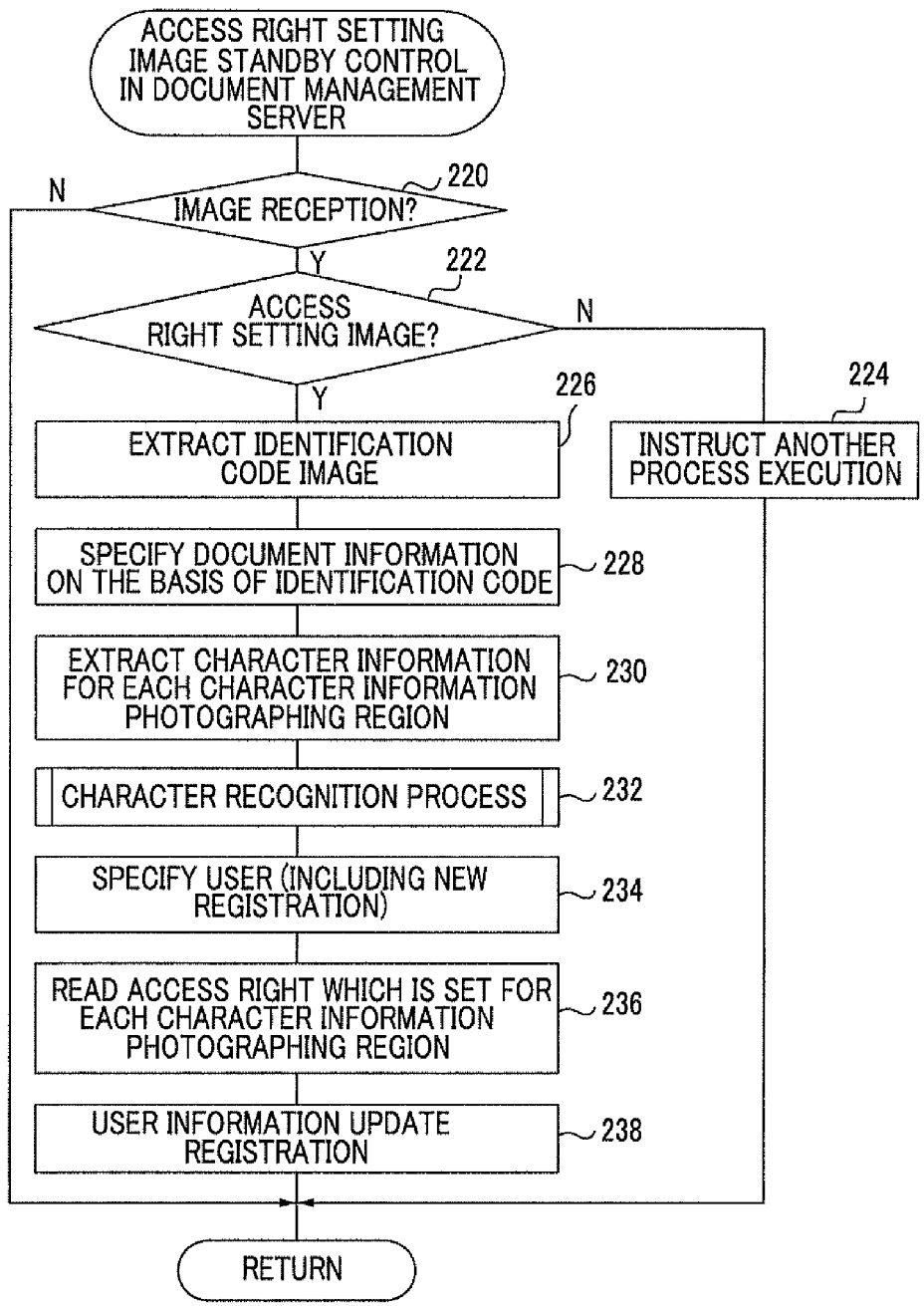

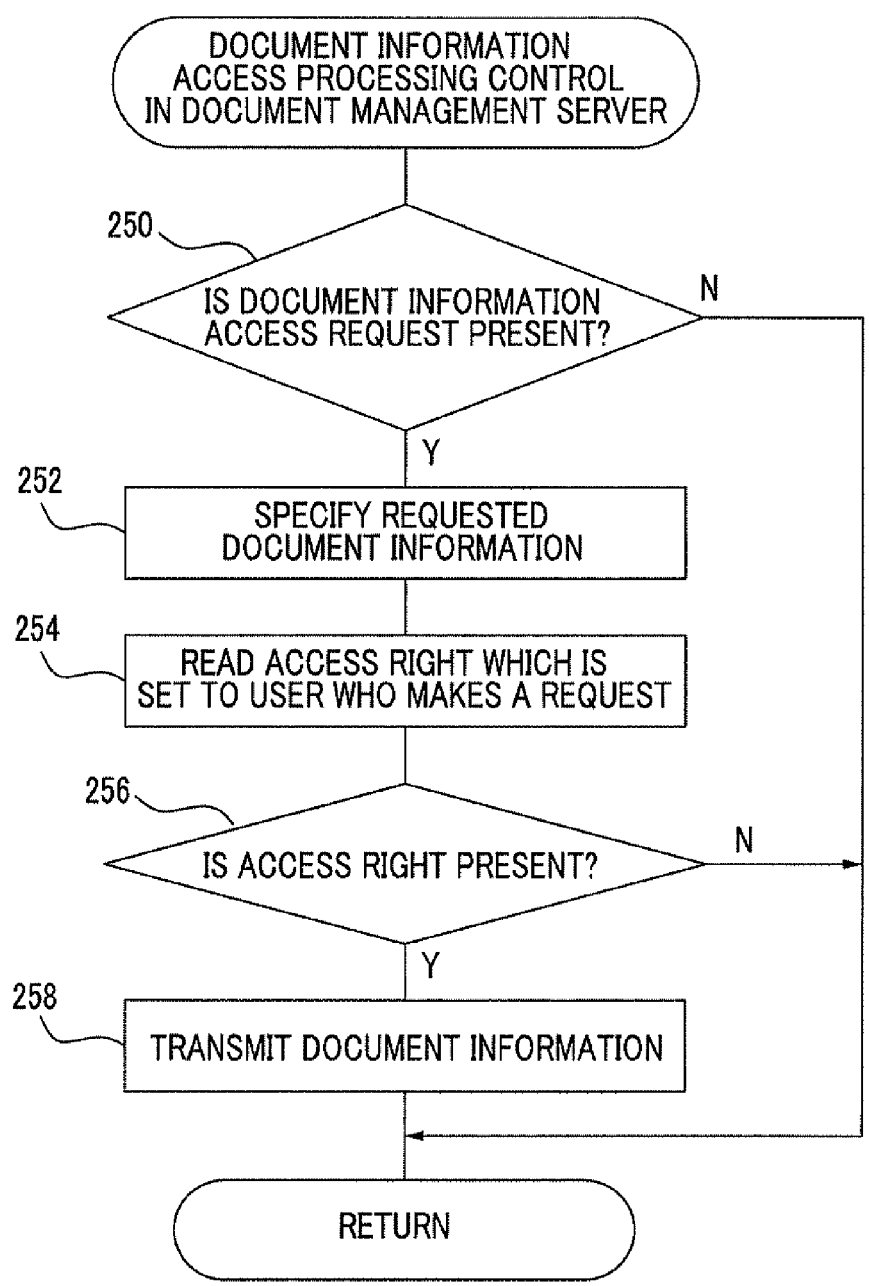

US 8,943,097 B2

INFORMATION MANAGEMENT APPARATUS, INFORMATION MANAGEMENT SYSTEM, NON-TRANSITORY COMPUTER READABLE MEDIUM THAT STORES INFORMATION MANAGEMENT PROGRAM AND INFORMATION MANAGEMENT METHOD

CROSS-REFERENCE TO RELATED APPLICATIONS

This application is based on and claims priority under 35 USC 119 from Japanese Patent Application No. 2012-048106 filed Mar. 5, 2012.

BACKGROUND

Technical Field

The present invention relates to an information management apparatus, an information management system, a non-transitory computer readable medium that stores an information management program, and an information management method.

SUMMARY

According to an aspect of the invention, there is provided an information management apparatus including: a memory that stores main information to be stored in a state of being able to be identified by at least an identification code; a receiving unit that receives the identification code for identifying the main information and image information where character information for specifying a user of the main information is photographed; a specifying unit that specifies the main information stored in the memory on the basis of the identification code and specifies the user on the basis of the character information, among the image information received by the receiving unit; a character information photographing region determining unit that determines which main character information photographing region the character information belongs to, among plural character information photographing regions that are predetermined; and an access right assigning unit that assigns a predetermined type of access right to the user specified from the character information for each character information photographing region determined by the photographing region determining unit.

BRIEF DESCRIPTION OF THE DRAWINGS

Exemplary embodiments of the present invention will be described in detail based on the following figures, wherein:

FIG. 1A is a diagram illustrating a network system including a communication line network between a document management apparatus and a mobile device according to an exemplary embodiment of the invention, FIG. 1B is a block diagram illustrating a hardware configuration of the document management apparatus.

FIG. 5 is a front view illustrating a display screen of a mobile device according to an exemplary embodiment of the invention;

FIG. 6 is a flowchart illustrating an access right setting control routine on a mobile device side according to an exemplary embodiment of the invention;

FIG. 7 is a flowchart illustrating an access right setting image standby control routine in a document management server according to an exemplary embodiment of the invention; and FIG. 8 is a flowchart illustrating the flow of a document information access processing control in a document management server according to an exemplary embodiment of the invention.

DETAILED DESCRIPTION (System Configuration)

Figure 1C:
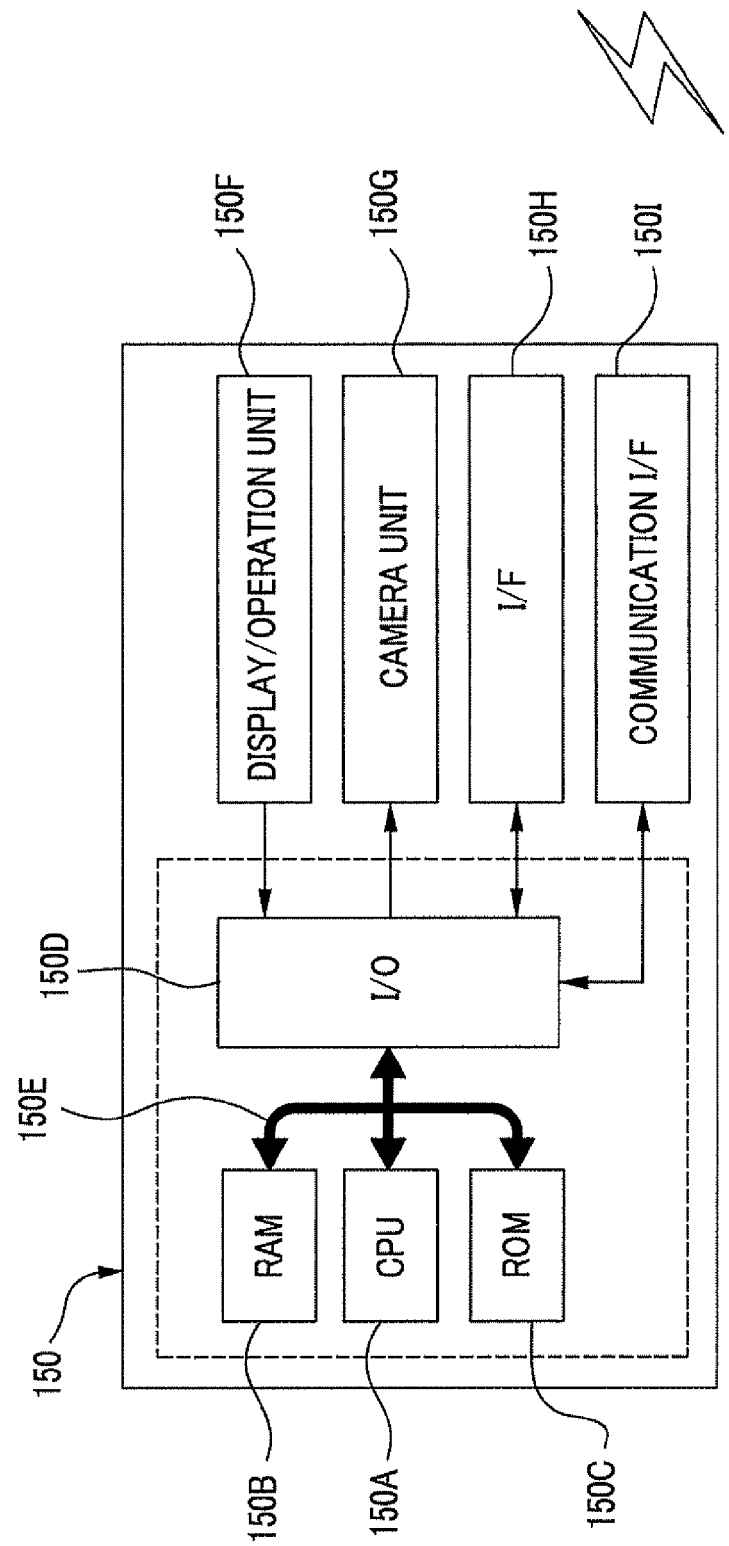
FIG. 1C is a block diagram illustrating a hardware configuration of the mobile device.

FIG. 1 is a diagram illustrating a network system including a communication line network 20 according to an exemplary embodiment of the invention.

As shown in FIG. 1A, plural (three in FIG. 1) image processing devices 10A, 10B and 10C (hereinafter, may be generally referred to as an "image processing device 10", "image processing devices 10A to 10C" or the like) according to an exemplary embodiment of the invention are respectively connected to the communication line network 20. In FIG. 1, three image processing devices 10A to 100 as the image processing device 10 are connected, but the number thereof is not limiting.

Further, plural (three in FIG. 1) PCs (personal computers) 21 are connected to the communication line network 20. In FIG. 1, three PCs 21 are connected, but the number thereof is not limiting, and one or two PCs may be used, or four or more PCs may be used.

Further, in addition to the PCs 21, a communication terminal 150 (hereinafter, referred to as a "mobile device 150") that transmits and receives information in a wireless manner through a wireless communication device 22 is connected to the communication line network 20. Further, the wireless communication device 22 may be connected to the mobile device 150 through an Internet communication line network.

Further, the communication line network 20 is not necessarily connected in a wired manner. That is, the communication line network 20 may be a communication line network that transmits and receives information in a wireless manner.

In the image processing device 10, for example, data may be transmitted to the image processing device 10 from the PCs 21 by remote control to perform an image forming (printing) instruction operation, or a process such as copy, scanning (image reading) or facsimile transmission/reception may be instructed by various operations of a user who stands in front of the image processing device 10.

Further, as shown in FIG. 1A, a document management apparatus 100 (hereinafter, referred to as a "document management server 100") is connected to the communication line network 20. The document management server 100 receives document information from the PCs 21 or the mobile device 21 that is connected to the communication line network 20 for storage, to perform batch management. Description about a detailed function of the document management server 100 will be omitted.

As shown in FIG. 1B, the document management server 100 includes a CPU 100A, a RAM 100B, a ROM 100C, an I/O 100D and a bus 100E such as a data bus or control bus that connects the CPU 100A, the RAM 100B, the ROM 100C and the I/O 100D to each other.

An input device 100F such as a keyboard or a mouse and a monitor 100G are connected to the I/O 100D. Further, the communication line network 20 is connected to the I/O 100D through an I/F 100H.

It is sufficient if the document management server 100 may basically perform data transmission and reception, and thus, the input device 100F or the monitor 100G are not essential components. For example, at the time of maintenance, a PC or the like may be connected to an exclusive use or general purpose I/F to replace the input device 100F or the monitor 100G.

As shown in FIG. 1C, the mobile device 150 includes a CPU 150A, a RAM 150B, a ROM 150C, an I/O 150D, and a bus 150E such as a data bus or control bus that connects the CPU 150A, the RAM 150B, the ROM 150C and the I/O 150D to each other.

An operation/input device 150F such as a touch panel, a camera unit 150G, an I/F 150H that is an end connection with an external device that is represented as a USB, and a wireless (or wired) communication I/F 150I are connected to the I/O 150.

(Schematic Configuration of Image Processing Device)

Figure 2:
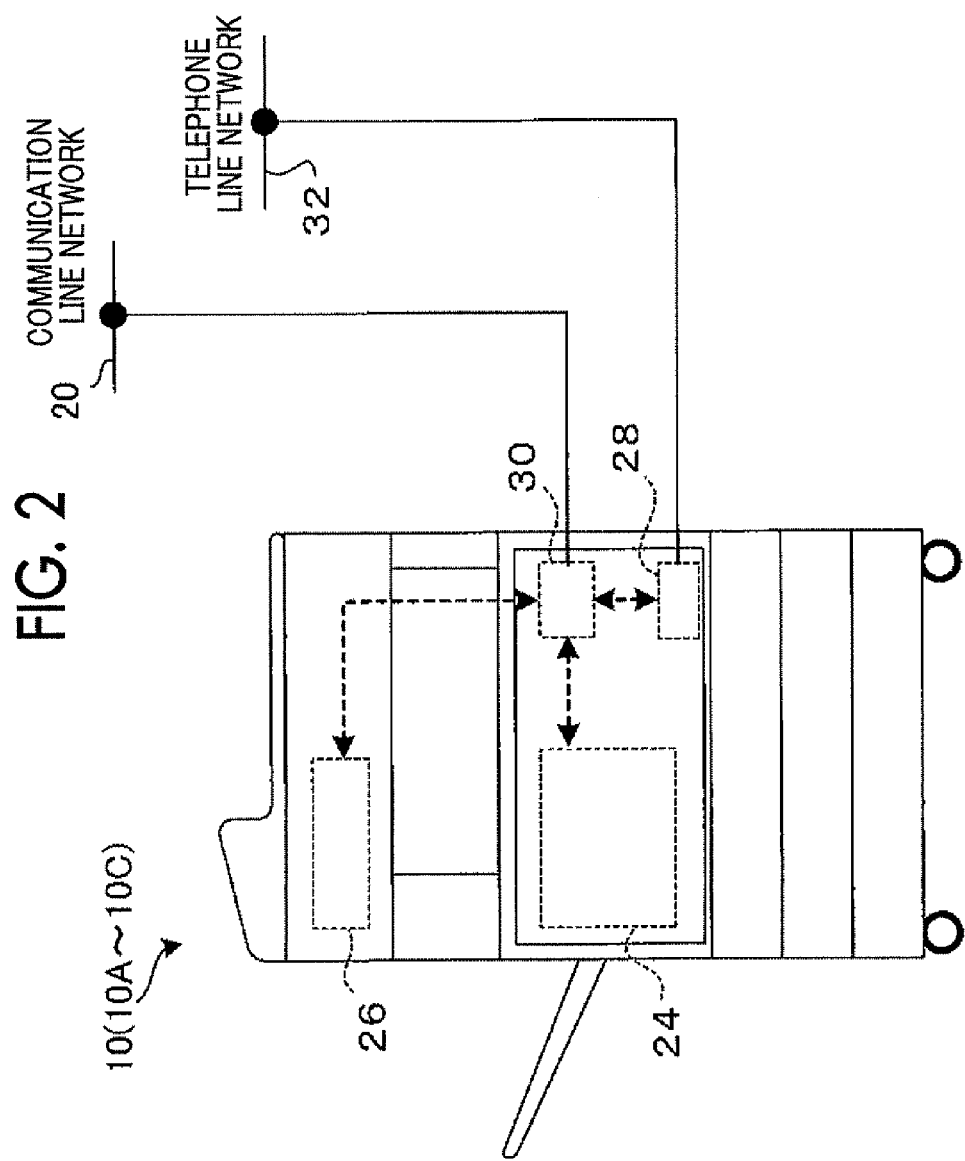
FIG. 2 is a diagram schematically illustrating an image processing device according to an exemplary embodiment of the invention.

FIG. 2 shows the image processing device 10 according to an exemplary embodiment of the invention.

The image processing device 10 includes an image forming unit 24 that forms an image on a recording sheet, an image reading unit 26 that reads a document image, and a facsimile communication control circuit 28. Further, the image processing device 10 includes a main controller 30 that controls the entire device, to control the image forming unit 24, the image reading unit 26, and the facsimile communication control circuit 28, to firstly store image data on the document image read by the image reading unit 26, or to transmit the read image data to the image forming unit 24 or the facsimile communication control circuit 28.

The communication line network 20 such as the Internet is connected to the main controller 30, and a telephone line network 32 is connected to the facsimile communication control circuit 28. The main controller 30 is connected to the PCs 21 through the communication line network 20, for example, to receive image data, or to perform facsimile reception and facsimile transmission using the telephone line network 32 through the facsimile communication control circuit 28.

A copy holder that positions a copy, a scanning drive system that performs light irradiation for scanning an image of the copy positioned in the copy holder, and a photoelectric conversion element such as a CCD that receives light reflected or transmitted by the scanning of the scanning drive system and converts the result to an electric signal are provided in the image reading unit 26.

The image forming unit 24 includes a photosensitive member. Around the photosensitive member, a charging device that uniformly charges the photosensitive member, a scanning exposure unit that performs light beam scanning on the basis of image data, an image developing unit that develops an electrostatic latent image formed by scanning and exposure of the scanning exposure unit, a transfer unit that transfers the developed image on the photosensitive member onto a recording sheet, and a cleaning unit that cleans a surface of the photosensitive member after transfer are provided. Further, a fixing unit that fixes the image on the recording sheet after transfer is provided on a transport path of the recording sheet.

In the present exemplary embodiment, the document management server 150 is applied as an information management apparatus. On the other hand, both of the mobile device 100 and the PCs 21 are applied as terminal devices. Thus, hereinafter, the mobile device 150 is described as an example of the terminal devices, but if the mobile device 150 is replaced with the PC 21, the same effect is obtained.

(Function of Document Management Server 100)

Here, in the present exemplary embodiment, the document management server 100 stores image data that is received from the mobile device 150 or the like connected to the communication line network 20 in a batch, for management.

Identification signs (may be referred to as an "identifier", "ID" or the like) are respectively assigned to the stored image data (main image). The image data may be specified by the identification codes.

The main image includes a photo image, a character image, a compound image thereof or the like, that is classified by an extension (".doc", ".txt", ".pdf" ".jpg" or the like). Further, the identification code is generated by combination with an independent number or symbol, for identification. Although not specialized for a document image (image to which an extension such as ".doc" or ".txt" is assigned) in the image data, the document management server 100 according to the present exemplary embodiment is basically used for management of the document image.

The mobile device 150 or the like includes a general information processing function that if an identification code is input and transmitted in the mobile device 150, a corresponding main image is read from the document management server 100 and is transmitted to the mobile device 150 through the communication line network 20.

The read main image is displayed in a visible state. A user may read the main image. Further, if the user has an access right, the user can perform replacement, movement of the entire document, copy, deletion, edition of content of the document, or modification of a current handling status of the document information.

The access right is set for each main image and each user. Thus, a different access right assigned to each of plural users is registered in advance to be, so-called, matched with the main image.

In this case, the following procedure is used as a general procedure indicating a comparative example.

(Operation 1)

A corresponding main image is specified using an identification code or the like.

(Operation 2)

An access right setting screen is read.

(Operation 3)

A user is specified from a user management table that includes IDs, names, posts or the like of users.

(Operation 4)

The type of the access right is set for each of the plural users.

In the procedure of the comparative example, since the number of operations is increased according to the number of main images×users, a complicated operation may be forced.

On the other hand, as another comparative example, a technique may be considered in which an identification code for specifying a main image and plural calling card images are simultaneously photographed and character information on each calling card is analyzed (character-recognized) to extract a user and to assign an access right. However, the same access right may be assigned to different users extracted from the plural calling cards. Further, in the case of modification, after setting of the access right by calling card photographing, a separate edition process may be necessary.

Figure 4:
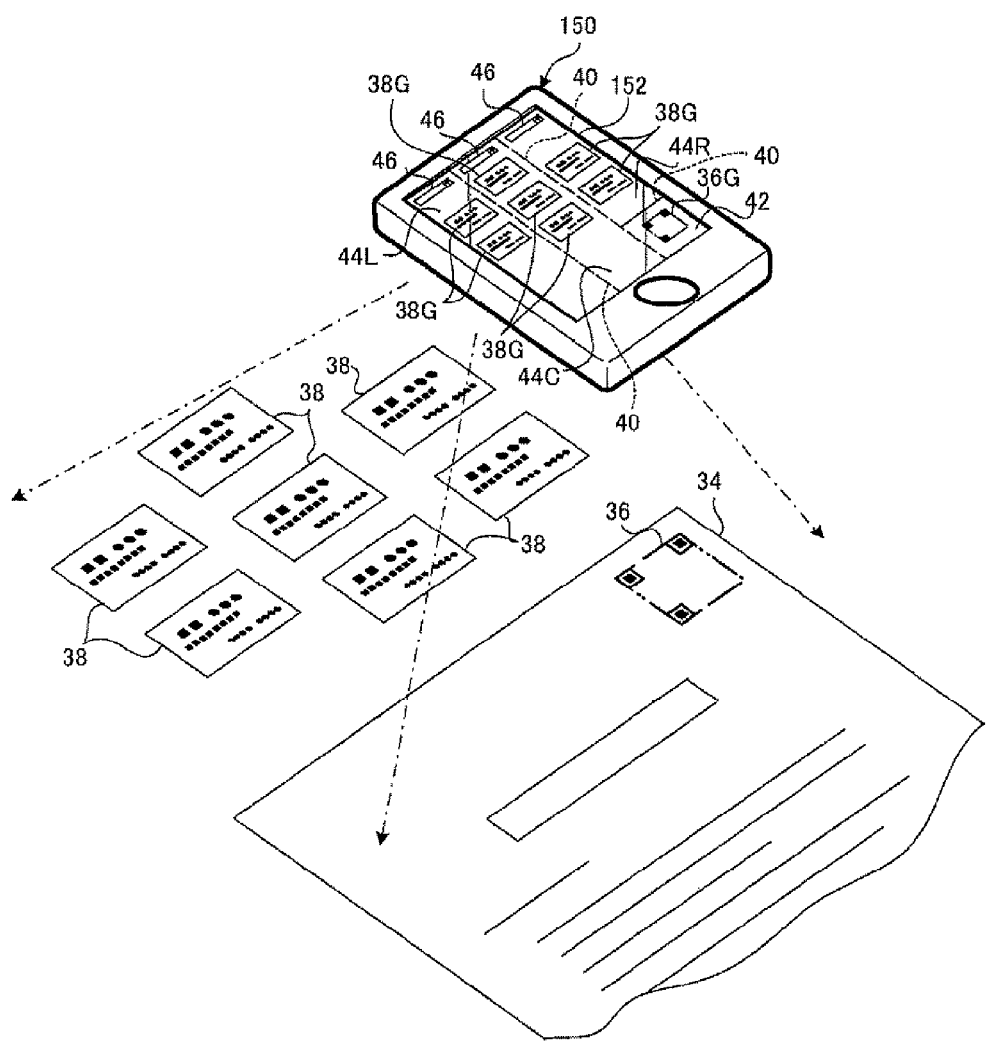
FIG. 4 is a perspective view illustrating photographing of an identification code and a calling card using a mobile device according to an exemplary embodiment of the invention.

On the other hand, in the present exemplary embodiment, by installing an access right setting application program to the mobile device 150, as shown in FIG. 4, when an identification code (QR code (registered trademark)) 36 for specifying a main image 34 and a calling card 38 are simultaneously photographed by the camera function of the mobile device 150, a photographing region of the calling card 38 is set.

That is, as shown in FIG. 5, in a state where the application program starts up in the mobile device 150, a dashed line image 40 is displayed as a photographing region index image on a display/operation unit 152 (touch panel screen) on which a preview image (through-the-lens image) is displayed. Hereinafter, an image of the identification code 36 may be referred to as an identification code image 36G, and an image of the calling card 38 may be referred to as a calling card image 38G.

Using the dashed line image 40, a lower right corner portion of the display/operation unit 152 corresponds to an identification code photographing region 42 where the identification code 36 is disposed. Further, using the dashed line image 40, when the other portion of the display/operation unit 152 is longitudinally divided into three, the left, central and right portions respectively correspond to character information photographing regions 44L, 44C and 44R. Here, the character information photographing regions are not limited to three-division, and thus, the entire divided regions may be generally referred to as a "character information photographing region 44".

The photographing region index image is not limited to the dashed line image 40, but may be a solid line, or may be distinguished by a background color. In a word, it is sufficient if the identification code photographing region 42 and the character information photographing regions 44L, 44C and 44R may be visually distinguished. Further, the respective positions or shapes of the identification code photographing region 42 and the character information photographing regions 44L, 44C and 44R are not limiting, and thus, the identification code photographing region 42 may be disposed in the center, and the plural character information photographing regions 44 may be disposed in a radial form.

Here, different access rights are respectively assigned to the character information photographing regions 44L, 44C and 44R. For example, the access right includes a manager right, a writing and reading right, a writing right, a reading right or the like, and may be set for each of the character information photographing regions 44L, 44C and 44R.

That is, in the display/operation unit 152 of the mobile device 150, a pull-down menu screen 46 is displayed in each upper portion of the divided character information photographing regions 44L, 44C and 44R. The pull-down menu screen 46 includes a setting item screen 46A and a pull-down instruction screen 46B on which an inverted triangle (∇) mark image is displayed. Here, if the pull-down instruction screen 465 is touched, access right types are list-displayed under the setting item screen 46A (not shown), and an item of the access right selected from among the access right types is displayed on the setting item screen 46A.

In FIG. 5, the character information photographing region 44L corresponds to a manager right, the character information photographing region 44C corresponds to a writing right, and the character information photographing region 44R corresponds to a reading right.

As shown in Table 1, the relationship between the character information photographing regions and the access rights may be template and stored in advance, and may be selected as necessary. Regions in Table 1 represent coordinates of an upper left corner portion and a lower right corner portion of each character information photographing region on the display/operation unit 152 (a to z represent coordinate values on two-dimensional x-y coordinates). The display/operation unit 152 in FIG. 5 shows an example in which "Tempi" is selected. The identification code photographing region 42 is fixed in the lower right portion.

TABLE 1

| Template ID | Manager right | Writing right Reading right | Writing right | Reading right |
|---|---|---|---|---|
| Temp1 | Region (a, b) | ***** | Region (c, d) | Region (e, f) |
| Temp2 | Region (g, h) | Region (i, j) | ***** | Region (k, l) |
| Temp3 | Region (m, n) | Region (o, p) | Region (q, r) | Region (s, t) |
| Temp4 | ***** | Region (u, v) | Region (w, x) | Region (y, z) |

The mobile device 150 transmits a captured image, that is, an image including the identification code image 36G and the calling card image 38G for specifying the main image to the document management server 100.

The document management server 100 analyzes the image received from the mobile device 150 and extracts the identification code to specify the main image 34 (see FIG. 4), and analyzes characters (characters printed in the calling card 38 (see FIG. 4)) from the calling card image 38G photographed in the character information photographing regions 44L, 44C and 44R and searches a user. Further, in a case where the searched user is not present in the registered users, the searched user may be registered as a new user.

In FIG. 5, an example is shown in which only one image of the identification code 36 is present in the identification code photographing region 42, but in a case where images of the plural identification codes 36 are disposed in the identification code photographing region 42, the plural identification codes 36 are photographed.

Figure 3:
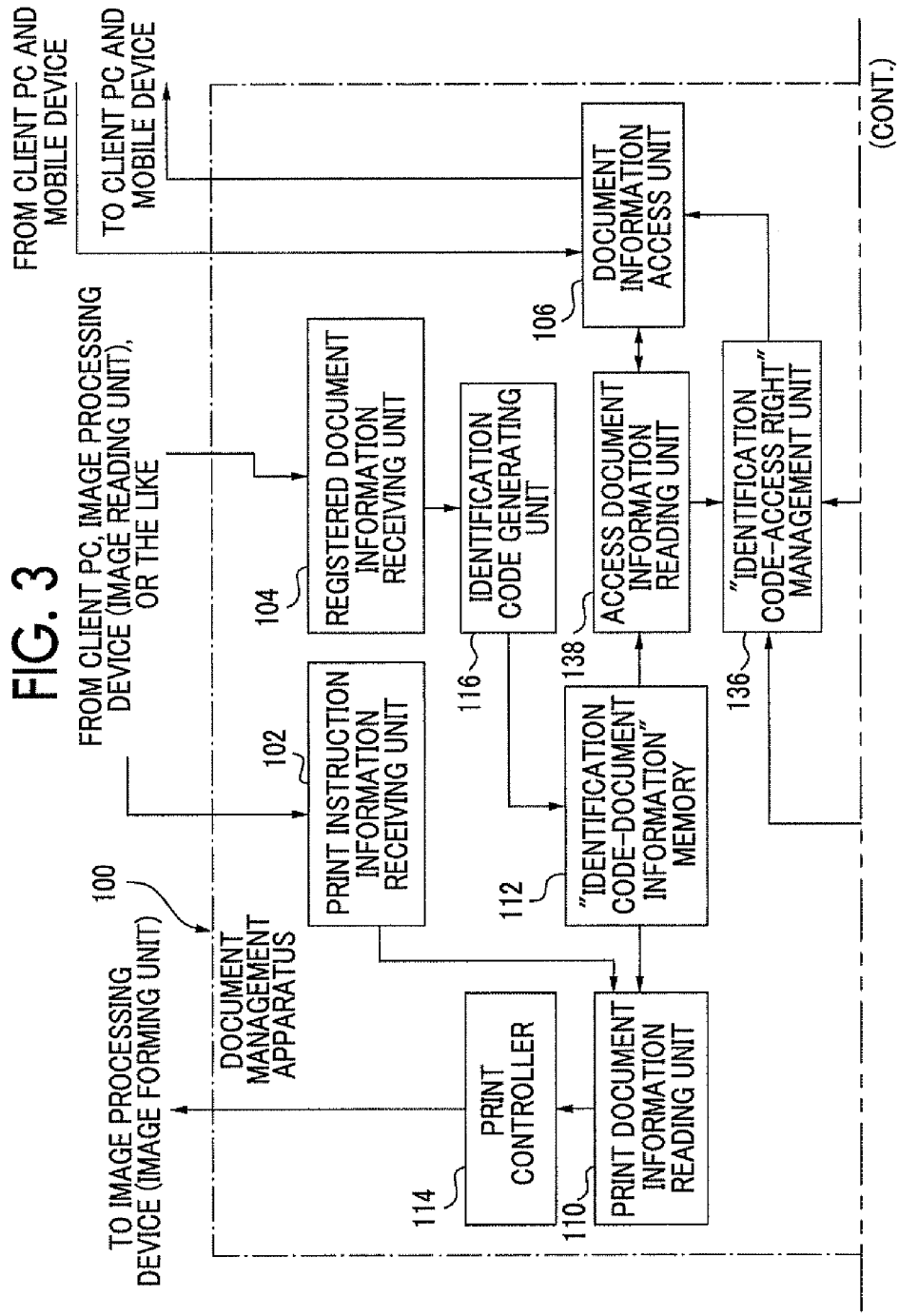
FIG. 3 is a functional block diagram functionally illustrating photographing of an identification code and a calling card in a mobile device and a setting control of an access right of each user to a main image that is specified in a document management server according to an exemplary embodiment of the invention.

FIG. 3 is a functional block diagram functionally illustrating a control for photographing of the identification code 36 and the calling card 38 in the mobile device 150 and access right setting of each user for a specified main image in the document management server 100. Further, respective blocks in the functional block diagram are classified according to functions, and do not limit hardware configurations of the document management server 100 and the mobile device 150.

(Document Management Server 100)

As shown in FIG. 3, the document management server 100 includes a printing instruction information receiving unit 102, a registered document information receiving unit 104, a document information access unit 106 and an access right setting image receiving unit 108.

An input source of the printing instruction information receiving unit 102 and the registered document information receiving unit 104 is the PCs 21 or the image reading unit 26 of the image processing apparatus 10, and an input source of the identification code image receiving unit 108 is the mobile device 150. Further, an access point of the document information access unit 106 is the PCs 21 or the mobile device 150.

For example, if a printing instruction is given from the PCs 21, the printing instruction is received by the printing instruction information receiving unit 102. The printing instruction information receiving unit 102 is connected to a printing document information reading unit 110. The printing document information reading unit 110 reads document information about an instructed printing target (the instruction is performed for an identification code) from an "identification code—document information" memory 112.

The printing document information reading unit 110 is connected to a printing controller 114, and outputs the document information to the image forming unit 24 of the image processing apparatus 10 on the basis of the read document information and instructs printing. Thus, the image forming unit 24 records (prints) the document on a sheet medium.

Further, for example, if a document registration instruction (for new registration or update registration) is given from the PCs 21, the registration instruction is received by the registered document information receiving unit 104. The registered document information receiving unit 104 is connected to an identification code generating unit 116. The identification code generating unit 116 generates an identification code for document information to be registered. In this regard, in a case where an applicable identification code is assigned together with the document information, it is also possible to apply the identification code.

The identification code generating unit 116 is connected to the "identification code—document information" memory 112. Here, the document information is stored in the "identification code—document information" memory 112 to be matched with the identification code.

The access right setting image receiving unit 108 receives an access right setting image where the identification code and the calling card are photographed from the mobile device 150 (for example, a transmission and reception unit 160 to be described later). The access right setting image receiving unit 108 is connected to an image analyzing unit 118. The image analyzing unit 118 is connected to an identification code extracting unit 120. The identification code extracting unit 120 extracts an identification code from the analyzed access right setting image.

Further, the image analyzing unit 118 is connected to a template type extracting unit 122, and the template type extracting unit 122 extracts a template type for specifying the divided photographing regions from the analyzed access right setting image.

Further, the image analyzing unit 118 is connected to a character information extracting unit 124, and the character information extracting unit 124 extracts character information printed on the calling card 38 (see FIG. 4), from the analyzed access right setting image.

The character information extracted by the character information extracting unit 124 is transmitted to a character recognition unit 126, which recognizes characters by a technique such as a pattern recognition or the like, for example, and transmits the result to a user specifying unit 128.

The user specifying unit 128 is connected to a user information registration unit 130. Users who use an access right are registered in advance in the user information registration unit 130, as shown in Table 2, from which a user specified in the user specifying unit 128 is read.

TABLE 2

| User ID | Name | Mail address | Company | Department | Telephone number | Address |
|---|---|---|---|---|---|---|
| U001 | AB | ..0.@.&& | ·· Trading company | H.R | 090-**-** | Tokyo |
| U002 | CD | .1..@.&& | ·· Trading company | H.R | 090 | Yokohama |

TABLE 2-continued

| User ID | Name | Mail address | Company | Department | Telephone number | Address |
|---|---|---|---|---|---|---|
| U003 | EF | ..4.@.&& | ·· Trading company | R, D | 080 | USA |
| U004 | GH | .3..@.&& | ·· Trading company | M.M | 090 | Fukuoka |
| . | . | . | . | . | . | . |
| . | . | . | . | . | . | . |
| . | . | . | . | . | . | . |

Here, in a case where the user specified in the user specifying unit 128 is not registered in the user information registration unit 130, the access right is not assigned to the user. Further, in a case where a new registration is additionally allowed, the new registration may be performed.

The user specifying unit 128 is connected to an access right setting unit 132, and transmits information about the specified user. Further, the access right setting unit 132 assigns the access right to the user registered through the user specifying unit 128 to be matched with document information corresponding to the extracted identification code, and performs registration.

In a case where plural identification codes are extracted, the access right is assigned and registered for each corresponding document information. Here, the access rights assigned to the users are the same for each document. Specifically, a user who is given only the writing right with respect to main document information is also given only the writing right with respect to different document information.

Further, the access right setting unit 132 is connected to the template type extracting unit 122. The access right setting unit 132 is connected with an image area—access right table memory 134, and sets the access right for each user from the specified user and the photographed region (character information photographing regions 44L, 44C and 44R shown in FIG. 5).

The access right setting unit 132 is connected to an "identification code—access right" management unit 136. The identification code extracted by the identification code extracting unit 120 is transmitted from the identification extracting unit 120 to the "identification code—access right" management unit 136, in which the identification code and the access right for each user are so-called linked and stored for management.

When there is an access request with respect to document information from the PCs 21 or the mobile device 150, the document information access unit 106 reads the document information from the "identification code—document information" memory 112 through an access document information reading unit 138, and sends a reply. At this time, the "identification code—access right" management unit 136 specifies an accessing user, and assigns the set access right to the specified user with respect to the transmitted document information.

(Mobile Device 150)

The mobile device 150 includes the display/operation unit 152. In recent years, a technique has been widely used in which almost the entire casing that forms the mobile device 150 functions as a touch panel.

The display/operation unit 152 is connected to the photographing controller 154, and performs a photographing instruction using a camera unit 156 according to a specific operation. The camera unit 156 is a so-called digital camera that includes an image pickup device such as a CCD or a CMOS and a lens.

The camera unit 156 is capable of photographing pictures as a normal function. However, in the present exemplary embodiment, the camera unit 156 is configured to photograph the identification code 36 and the calling card 38 assigned for specifying a document, on a medium such as a sheet on which the document is visibly printed by the camera unit 156 on the basis of control of the photographing controller 154, at the start-up of the access right setting application program (see FIG. 4).

The photographing controller 154 displays the dashed line image 40 in the display/operation unit 152, as shown in FIG. 5, in photographing at the start-up of the access right setting application program, to visibly notify the identification code photographing region 42 and the character information photographing region 44 to a photographer. Further, division at this time is selected from the template in Table 1.

The photographing controller 154 transmits an access right setting image that includes the photographed identification code and calling card to an information output unit 158. The information output unit 158 transmits the access right setting image to the document management server 100. For example, the information output unit 158 transmits the access right setting image through a transmission and reception unit 160 by remote control in a wireless manner. Further, although not shown, in a case where a branch line of the communication line network 20 in FIG. 1 is connected, or in a case where photographing is performed using a camera that belongs to the PCs 21, the mobile device 150 transmits the access right setting image to the document management server 100 in a wired manner.

Hereinafter, operations of the present exemplary embodiment will be described.

(Printing Process in Document Management Server 100)

In a case where a document stored in the document management server 100 is printed, for example, the PCs 21 give an identification code for specifying the document and a printing instruction to the document management server 100 as a request.

If the printing instruction is received through the printing instruction information receiving unit 102, the document management server 100 reads document information from the "identification code—document information" memory 112, and transmits the document information to the image processing device 10 designated by the PCs 21 from the printing controller 114.

The image processing device 10 that receives the document information starts up the image forming unit 24 to print the document on a sheet medium on the basis of the document information. Here, an identification code for specifying the document is printed in parallel on the sheet medium in any place of four corners thereof, for example. The identification code is photographed by the camera unit 156 of the mobile device 150, and may be applied to specify document information.

(Document Registration in Document Management Server 100)

In a case where document information is registered in the document management server 100, for example, the PCs 21 transmit the document information and an initial status of the document information to the document management server 100. The document information is received by the registered document information receiving unit 104.

The identification code generating unit 116 assigns an identification code to the received document information. Further, in a case where an identification code is assigned in advance when the document information is transmitted, this identification code may be used.

(Assignment of Access Right to User)

The document information registered in the document management server 100 is read as an access is requested to the document information access unit 106, and is transmitted to a user who requests the access. However, the entire access rights may not be assigned with respect to the entire document information, and as necessary, a different access right may be assigned to each user with respect to the same document information.

For example, when conference materials (document information) are distributed to users who participate in a conference, the entire rights (management right) may be assigned to apart of the users, a writing right for requesting approval or the like may be assigned to another part of the users, and a reading right for reading the conference materials as future development study materials may be assigned to still another part of the users, according to posts, relevant departments or the like.

In such a case, in the procedure of the above-described comparative example, a complicated operation of inputting an access right while individually registering a user should be carried out.

Accordingly, in the present exemplary embodiment, a calling card collected from a user to be registered and an identification code for specifying document information to which a right is assigned are photographed in a batch by the camera unit 156 of the mobile device 150, and the character information photographing region 44 (character information photographing regions 44L, 44C and 44R in FIG. 5) is set so that a different access right is set according to arrangement of the calling card.

The captured image is analyzed in the document management server 100 to extract the identification code image 36G and the calling card image 38G to specify the photographed region. Thus, a different access right is assigned to each user specified by the calling card 38.

Hereinafter, a procedure of access right setting at the start-up of an access right setting application program and the flow of a document information request control will be described with reference to flowcharts of FIGS. 6 to 8.

FIG. 6 is a flowchart illustrating an access right setting control routine on the side of the mobile device 150.

In step 200, the dashed line image 40 is displayed on the display screen 152 that is the display/operation unit 150F of the mobile device 150. Thus, as shown in FIG. 5, the regions are divided into the identification code photographing region 42 and the character information photographing regions 44L, 44C and 44R.

Next, in step 202, by operating the pull-down menu screens 46 displayed in the character information photographing regions 44L, 44C and 44R, an access right is assigned to each of the character information photographing regions 44L, 44C and 44R.

More specifically, if the pull-down instruction screen 46B is touched, access right types are list-displayed under the setting item screen 46A, and an access right type is selected from among the access right types. Thus, an item of the access right is displayed on the setting item screen 46A, to thereby complete the setting.

Next, in step 204, it is determined whether a photographing instruction (shutter operation) is present. If it is determined that the photographing instruction is present, the routine goes to step 206 to perform a photographing process.

Next, in step 208, image processing of a captured image is performed, and then, the routine goes to step 210 to perform a transmission process to the document management server 100. Then, the routine ends.

That is, if the above-described processes are replaced with operations of a photographer, the following procedure is obtained.

(Operation 1)

In the mobile device 150, the access right setting application program starts up.

(Operation 2)

Each access right of the document information photographing region 44 is set (see FIG. 5).

(Operation 3)

For example, the sheet medium 34 on which a main image is printed and the calling card 38 are disposed on a table (desk).

(Operation 4)

Photographing is performed so that the identification code 36 (QR code (registered trademark)) printed in an upper right portion of the sheet medium 34 is disposed in the identification code photographing region 42 and the calling card 38 is disposed in a desired position of the character information photographing region 44.

FIG. 7 is a flowchart illustrating an access right setting image standby control routine in the document management server 100.

In step 220, it is determined whether an image is received. If it is determined that the image is not received, the routine ends. On the other hand, if it is determined in step 220 that the image is received, the routine goes to step 222 to determine whether the received image is an access right setting image. If it is determined that the received image is not the access right setting image, since it is not necessary to set an access right, the routine goes to step 224 to instruct execution of a different process. Then, the routine ends.

If it is determined in step 222 that the received image is the access right setting image, the routine goes to step 226 to extract an identification code image from the received image.

Next, in step 228, document information is specified on the basis of the extracted identification code, and then, the routine goes to step 230. In step 230, character information is extracted from the received image for each character information photographing region 44.

Next, in step 232, a character recognition process is performed for the extracted character information. Then, the routine goes to step 234 to specify a user. Here, in a case where the recognized user is not registered, the user may be newly registered.

Next, in step 236, the access right set for each character information photographing region 44 is read and allocated to each user. Then, the routine goes to step 238 to update and register the registered user information. That is, the specified document information and the access right which are new are set to be matched for the user. Then, the routine ends.

FIG. 8 is a flowchart illustrating the flow of a document information access process control in the document management server 100.

In step 250, it is determined whether an access request to document information is present. If it is determined that the access request is not present, the routine ends.

Further, if it is determined in step 250 that the access request is present, the routine goes to step 252 to specify the requested document information. Then, the routine goes to step 254 to read an access right set to be matched with the requested document information and the requesting user.

Next, in step 256, it is determined whether the access right is set to the user. If it is determined that the access right is not set, the routine ends. If it is determined that the access right is set, the routine goes to step 258 to transmit the document information. Then, the routine ends. Further, in the example of FIG. 8, the transmission of the document information is performed when the access right is set to the user who performs the access request However, in a case where it may be determined that the type of the access request is deletion of the document information although only a partial access right such as a writing right is set to the user, the routine may end without transmission of the document information to the user.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information management apparatus comprising:
a memory that stores main information that is identified by at least an identification code, and that stores user information indicating a user of the main information;
a receiving unit that receives the identification code for identifying the main information along with image information including a photograph of character information for specifying the user;
a specifying unit that specifies the main information stored in the memory based on the identification code and specifies the user based on the character information, which is included in the image information received by the receiving unit;
a region determining unit that determines which region the character information is in, among a plurality of regions in the photograph that are predetermined, based on the presence of the character information in the photograph; and
an access right granting unit that grants a predetermined type of access right to the user specified from the character information, the granted type of access right being different for each region determined by the region determining unit.

2. The information management apparatus according to claim 1,
wherein the identification code and the character information are respectively stored in a separate paper medium, and at the time of photographing, a single identification code photographing region where the paper medium of the identification code is disposed and the plurality of regions where the paper medium of the character information is disposed are dividedly provided for photographing.

3. The information management apparatus according to claim 1,
wherein the specification of the user based on the character information in the specifying unit includes a case where a user registered in advance is searched using a recognized character for specification and a case where a user is newly registered for specification in a case where the user is not registered.

4. The information management apparatus according to claim 2,
wherein the specification of the user based on the character information in the specifying unit includes a case where a user registered in advance is searched using a recognized character for specification and a case where a user is newly registered for specification in a case where the user is not registered.

5. The information management apparatus according to claim 1,
wherein in a case where the plurality of identification codes is photographed, the same access right is granted to the user in the plurality of pieces of main information specified from the respective identification codes.

6. The information management apparatus according to claim 2,
wherein in a case where the plurality of identification codes is photographed, the same access right is granted to the user in the plurality of pieces of main information specified from the respective identification codes.

7. The information management apparatus according to claim 3,
wherein in a case where the plurality of identification codes is photographed, the same access right is granted to the user in the plurality of pieces of main information specified from the respective identification codes.

8. The information management apparatus according to claim 4,
wherein in a case where the plurality of identification codes is photographed, the same access right is granted to the user in the plurality of pieces of main information specified from the respective identification codes.

9. An information management system comprising:
a terminal device including
   a photographing unit that is able to capture an image of a subject by matching the subject to be photographed inside a display screen,
   a display controller that displays, on the display screen, a photographing region index image in which an identification code photographing region where an identification code for specifying a main image is photographed and a plurality of regions where character information for specifying a user of the main information is photographed are dividedly provided in a determinable manner, and
   a transmitting unit that transmits image information including the identification code, including a photograph of the character information photographed by the photographing unit; and
an information management apparatus including
   a memory that stores main information that is identified by at least an identification code, and that stores user information indicating a user of the main information;
   a receiving unit that receives the image information along with image information including the photograph of character information for specifying the user transmitted from the transmitting unit of the terminal device,
   a specifying unit that specifies the main information stored in the memory based on the identification code and specifies the user based on the character information, which is included in the image information received by the receiving unit,
   a region determining unit that determines which region the character information is in, among the regions in the photograph that are predetermined and divided by the photographing region index image, the regions being determined based on the presence of the character information in the photograph; and
   an access right granting unit that grants a different type of access right that is predetermined to the user specified from the character information, the granted type of access right being different for each region determined by the region determining unit.

10. A non-transitory computer readable medium that stores an information management program that causes a computer to be executed as the information management apparatus according to claim 1.

11. An information management method comprising:
storing main information that is identified by at least an identification code and user information indicating a user of the main information;
receiving the identification code for identifying the main information along with image information including a photograph of character information for specifying the user;
specifying the stored main information on based on the identification code and specifying the user based on the character information, which is included in the received image information;
determining which region the character information is in, among a plurality of regions that are predetermined, based on the presence of the character information in the photograph; and
granting a predetermined type of access right to the user specified from the character information, the granted type of access right being different for each determined region.

* * * * *